Patented Jan. 20, 1953

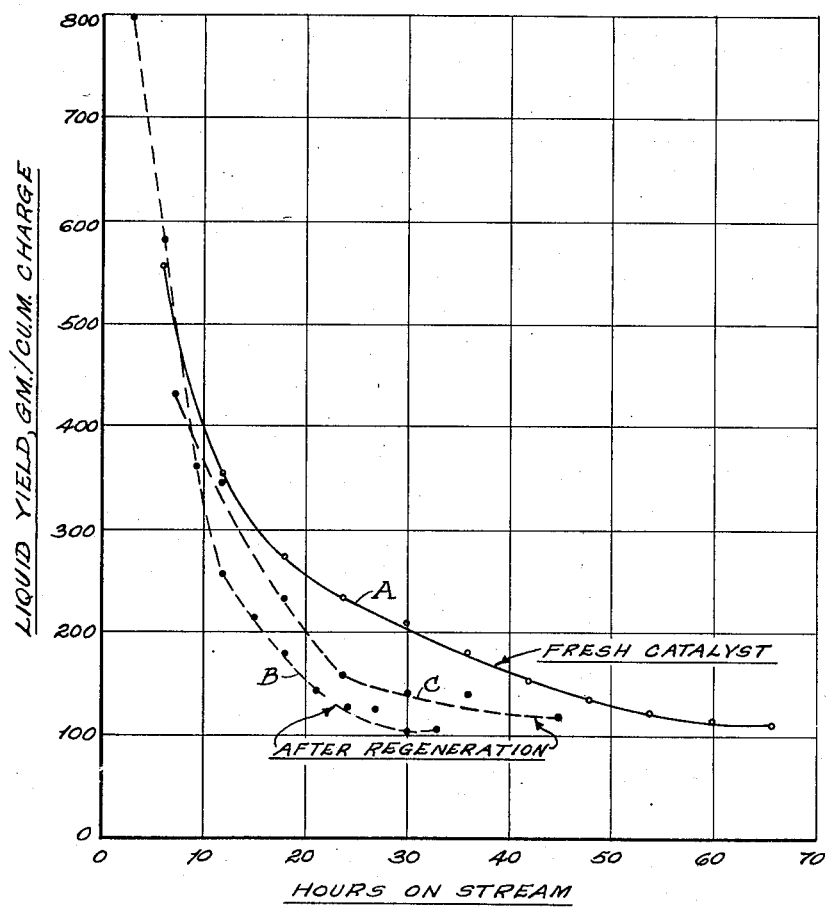

2,626,246

UNITED STATES PATENT OFFICE 2,626,246

REGENERATING COBALT CATALYSTS BY OXIDATION

Ernest A. Naragon, Glenham, and Joseph H. Vergilio and Alfred J. Millendorf, Beacon, N. Y., assignors to The Texas Company, New York, N. Y., a corporation of Delaware Application January 29, 1949, Serial No. 73,533

7 Claims. (Cl. 252—416)

This invention relates to a novel method for regenerating cobalt catalysts so as to restore them to a high level of activity for the catalytic conversion of olefins, carbon monoxide and hydrogen into carbonylic products.

In accordance with this invention, cobalt catalysts which have been used for the catalytic conversion of carbon monoxide, hydrogen and olefins into carbonylic products and whose catalytic activity is at a low level, are regenerated to a high degree of activity by contact with an oxygen-nitrogen mixture at a temperature between 100 and 400° F. for a period of at least 4 hours. The oxygen-nitrogen mixture employed for the regeneration of a cobalt catalyst has a composition of 1 to 25 per cent oxygen and 75 to 99 per cent nitrogen. Air serves well as a regenerating gas.

After treatment with an oxygen-nitrogen mixture in the aforedescribed manner, the cobalt catalyst can be used directly for the catalytic conversion of carbon monoxide, hydrogen and olefins into carbonylic products. Cobalt catalysts regenerated in this fashion possess a high level of activity for the conversion of carbon monoxide, hydrogen and olefins into liquid carbonylic products.

Cobalt catalysts have been found to be most effective for the conversion of olefins, carbon monoxide and hydrogen into carbonylic products. The conversion of olefins, carbon monoxide and hydrogen into carbonylic products is ordinarily effected at a temperature between 100 to 400° F. and at a pressure of 200 to 5,000 pounds per square inch in the presence of a cobalt catalyst. Various techniques such as slurry-type and fixed bed operations have been proposed and employed for the catalytic conversion of olefins, carbon monoxide and hydrogen into carbonylic products. The relatively rapid deterioration of catalytic activity of the cobalt catalysts in this conversion combined with the fact that cobalt catalysts are expensive has led to a search for a simple procedure for regenerating cobalt catalysts. Our discovery of a simple regenerating procedure for cobalt catalysts is a substantial factor in assuring the commercial success of processes based on the olefins-CO-$H_2$ reaction.

The present invention provides a very simple procedure for regenerating cobalt catalysts. The contacting of spent cobalt catalysts with a mixture of oxygen and nitrogen at a temperature between 100 and 400° F. for a period of at least 4 hours restores the catalysts to their initial activity. The treatment with the oxygen-nitrogen mixture can readily be effected in situ if conversion of olefins, carbon monoxide and hydrogen into carbonylic products is effected by contact with a fixed bed of cobalt catalysts. If a slurry technique is employed to convert olefins, carbon monoxide and hydrogen into carbonylic products, spent catalyst which has been filtered from the reactant slurry mass can be regenerated on the filter apparatus or in auxiliary apparatus.

The treatment of spent cobalt catalyst with an oxygen-nitrogen mixture is effected at a temperature between 100 and 400° F. and preferably at a temperature between 150 and 200° F.; regeneration has been found to proceed particularly smoothly at 150° F.

Atmospheric pressure is preferred for oxygen-nitrogen regeneration of the spent cobalt catalysts, but there does not appear to be any specificity as to pressure in the regeneration procedure of the subject invention. Pressures from atmospheric to 1,500 pounds per square inch and up can be employed. Pressure corresponding to that employed for production of carbonylic products may also be used.

It is necessary to continue the regenerative treatment for at least 4 hours in order to effect a high degree of reactivation. For best results the oxygen-nitrogen mixture is contacted with the spent cobalt catalyst at the prescribed temperature for a period of between 6 to 24 hours. Contact times in the upper half of the recommended contact period, appear to effect a slightly better regeneration than do contact times in the lower part of the prescribed period. However, the improvement is not of such a nature to demand longer contact times particularly if speed of regeneration is an essential factor.

The regenerating oxygen-nitrogen mixture is contacted with the spent cobalt catalyst at a space velocity between about 50 and 500, wherein space velocity is defined as volumes of regenerating mixture per volume of catalyst per hour. It has been found that space velocities of approximately 100 to 150 result in excellent reactivation of fixed bed cobalt catalysts.

The oxygen-nitrogen mixture comprises 1 to 25 per cent oxygen and 75 to 99 per cent nitrogen. A mixture comprising 3 per cent oxygen and 97 per cent nitrogen has been found to be particularly effective in the regeneration of cobalt catalysts. Air or any other convenient source of an oxygen-nitrogen mixture having the composition of 1 to 25 per cent oxygen and 75 to 99 per cent nitrogen restores the catalysts to a high level of activity. The presence of inert diluents does not have a harmful effect on the regeneration as long as the oxygen-nitrogen portion of the regenerating gas has the prescribed composition. Thus regeneration with air proceeds smoothly despite the presence of carbon dioxide and water vapor. In similar fashion the presence of gaseous aliphatic hydrocarbons such as methane is tolerated in the regenerating gas.

The novel regeneration treatment of the subject invention is applicable to all cobalt catalysts that have been employed in the catalytic conversion of olefins, carbon monoxide and hydrogen into carbonylic products. Supported, unsupported, fused, precipitated, promoted and unpromoted cobalt catalysts are all regenerated by the process of this invention to a high level of activity for the catalytic conversion of olefins, carbon monoxide and hydrogen.

A preferred catalyst for the production of carbonylic products is a precipitated cobalt catalyst in which metallic cobalt is supported on an adsorptive material such as an uncalcined diatomaceous earth, silica-stabilized alumina, etc., and which is promoted with minor quantities of oxides of metals such as magnesium, thorium, vanadium, manganese, calcium, etc. The efficacy of the regeneration procedure of the subject invention will be demonstrated with a precipitated cobalt catalyst which has been designated a standard cobalt catalyst and which has a composition of approximately 64 per cent uncalcined diatomaceous earth, 32 per cent cobalt, 3 per cent magnesia and 1 per cent thoria.

In the accompanying figure, there is shown graphically the results of the regenerative treatment of the subject invention. The reaction of ethylene, carbon monoxide and hydrogen to give a product comprising mainly diethylketone is employed to demonstrate the effectiveness of the regenerative treatment of this invention in restoring cobalt catalysts to a high level of activity. In our copending application, Serial No. 773,938, filed September 13, 1947, now abandoned, there is disclosed a process for directing the reaction between ethylene, carbon monoxide and hydrogen to produce a reaction product comprising mainly diethylketone. In brief, the conditions which must be maintained in order to convert ethylene, carbon monoxide and hydrogen into mainly diethylketone are summarized as follows: ethylene, carbon monoxide and hydrogen in a mol ratio of ethylene to carbon monoxide of at least 1.5 and a mol ratio of ethylene to hydrogen of at least 0.67 are contacted with a catalyst comprising a metal of the iron group, preferably cobalt; the temperature is maintained below 300° F. and preferably 150 and 200° F., and the pressure is maintained above 100 pounds per square inch and preferably between 100 and 1,500 pounds per square inch. The liquid product obtained by the reaction of ethylene, carbon monoxide and hydrogen under the aforedescribed conditions comprises better than 60% diethylketone.

The liquid yield in grams per cubic meter of charge is the best measure of catalyst activity and is used in the accompanying graph as a measure thereof. Liquid yield in grams per cubic meter of charge is plotted on the ordinate axis of the graph against on-stream time in hours on the abscissa axis.

The activity of a fresh standard cobalt catalyst is represented by Curve A. Ethylene, carbon monoxide and hydrogen in a mol ratio of 2:1:1 were contacted at a space velocity of 100 with a standard cobalt catalyst at a pressure of 300 pounds per square inch and at a temperature of 150° F. The liquid yield in grams per cubic meter of charge mixture at various periods of on-stream time is shown by Curve A. It will be noticed that the activity of the catalyst falls off fairly rapidly; 560 grams per cubic meter of charge are obtained after 6 hours on stream whereas after 66 hours, the yield has fallen to approximately 115 grams per cubic meter of charge.

Curves B and C illustrate the effect of the regenerative treatment of the subject invention on a spent cobalt catalyst. Similar regenerative treatments were employed for the catalysts whose activities are shown in Curves B and C with the exception that the oxygen-nitrogen mixture was contacted with the B catalyst for 24 hours and with the C catalyst for only 6 hours. The regenerative treatment comprised contacting the spent cobalt catalyst with 3 per cent oxygen, 97 per cent nitrogen mixture at a temperature of 150° F. and atmospheric pressure and at a space velocity of 100 volumes of $O_2$-$N_2$ mixture per volume of catalyst per hour.

After regeneration, the catalysts were evaluated in the diethylketone reaction. The conditions employed for the evaluation of regenerated catalysts are as follows: ethylene, carbon monoxide and hydrogen in a mol ratio of 2:1:1 were contacted with regenerated catalyst at a space velocity of 100, at a temperature of 150° F. and a pressure of 300 pounds per square inch. The activity of the catalyst regenerated for 24 hours is shown by the Curve B, and the activity of the catalyst regenerated for 6 hours is shown by the Curve C.

The effectiveness of the regenerative treatment is clearly demonstrated by these experiments. The 24-hour regenerated catalyst gave an initial yield substantially higher than the fresh catalyst and then levelled off at a somewhat lower level than the fresh catalyst. The 6-hour regenerated catalyst did not show quite as high an initial activity as a fresh catalyst but had approximately the same catalyst life.

It should be borne in mind that the regenerative treatment of this invention is not limited to a 3 per cent oxygen, 97 per cent nitrogen mixture. Air or other oxygen-nitrogen mixtures having a composition of approximately 1 to 25 per cent oxygen and 75 to 99 per cent nitrogen can be used to regenerate spent cobalt catalysts in accordance with the method of this invention. Nor is the procedure of the invention restricted to the regeneration of standard cobalt catalysts but is applicable to all cobalt catalysts that can be used to effect conversion of olefins, carbon monoxide and hydrogen into carbonylic products.

While contacting spent cobalt catalysts with an oxygen-nitrogen mixture under the prescribed conditions restores the catalyst to approximately its initial activity, it is also possible to follow the oxygen-nitrogen treatment with a reduction treatment which comprises contacting the oxygen-nitrogen treated catalyst with hydrogen for a period of at least 12 hours at a temperature between 450 and 750° F. The incorporation of the reduction treatment in the regeneration procedure slightly enhances the activity and the catalyst life of the regenerated catalyst. The improvement in catalyst activity and catalyst life brought by the reduction treatment is not sufficient to warrant it being classified as a preferred modification of the invention. If the reduction treatment is employed, it is advisable to contact the hydrogen with the oxygen-nitrogen treated catalyst at a temperature between 600 and 700° F. for a period between 18 and 24 hours.

Obviously many modifications and variations of the invention, as hereinbefore set forth, may be made without departing from the spirit and scope thereof, and therefore only such limitations should be imposed as are indicated in the appended claims.

We claim:

1. A process for regenerating cobalt catalysts which have become spent in the catalytic conversion of olefins, hydrogen and carbon monoxide into carbonylic compounds which consists essentially of contacting spent cobalt catalyst with a mixture of 1 to 25 per cent oxygen and 75 to 99 per cent nitrogen at a temperature between 100 and 400° F. for a period of at least 4 hours.

2. A process according to claim 1 in which the mixture of oxygen and nitrogen has a composition of about 3 per cent oxygen and 97 per cent nitrogen.

3. A process according to claim 1 in which air is employed as the regenerating gas.

4. A process according to claim 1 in which the temperature is maintained between 150 and 250° F.

5. A process according to claim 1 in which spent catalyst is contacted with a mixture of oxygen and nitrogen for a period of 6 to 24 hours.

6. A process according to claim 1 in which the mixture of oxygen and nitrogen is passed through spent cobalt catalyst at a space velocity of 50 to 500 volumes of gaseous mixture per volume of catalyst per hour.

7. A process according to claim 1 in which oxygen-nitrogen mixture is contacted with spent cobalt catalyst at atmospheric pressure.

ERNEST A. NARAGON.
JOSEPH H. VERGILIO.
ALFRED J. MILLENDORF.

REFERENCES CITED

The following references are of record in the file of this patent:

UNITED STATES PATENTS

| Number | Name | Date |
| --- | --- | --- |
| 1,915,362 | Hanks et al. | June 27, 1933 |
| 2,397,705 | Teter | Apr. 2, 1946 |
| 2,453,327 | Layng et al. | Nov. 9, 1948 |
| 2,529,236 | Hart et al. | Nov. 7, 1950 |